(12) United States Patent
Mata et al.

(10) Patent No.: US 11,051,569 B2
(45) Date of Patent: *Jul. 6, 2021

(54) WEARABLE THERMAL PROTECTION AND PERSPIRATION MANAGEMENT APPARATUS AND METHOD

(71) Applicant: Pandero Partners, LLC, Norwalk, CT (US)

(72) Inventors: Pedro P. Mata, Bridgeport, CT (US); Daniel E. Blank, Norwalk, CT (US)

(73) Assignee: Pandero Partners, LLC, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/428,377

(22) Filed: May 31, 2019

(65) Prior Publication Data
US 2019/0281910 A1    Sep. 19, 2019

Related U.S. Application Data

(63) Continuation-in-part of application No. 14/986,693, filed on Jan. 3, 2016, now Pat. No. 10,314,354.
(Continued)

(51) Int. Cl.
*A41D 20/00* (2006.01)
*A41D 31/02* (2019.01)
(Continued)

(52) U.S. Cl.
CPC ....... *A41D 31/125* (2019.02); *A41D 13/0537* (2013.01); *A41D 13/0543* (2013.01);
(Continued)

(58) Field of Classification Search
CPC .... A41D 20/00; A41D 31/02; A41D 2400/62; B32B 5/024; B32B 5/06; B32B 5/08; B32B 27/12
(Continued)

(56) References Cited

U.S. PATENT DOCUMENTS

| 1,139,942 A | 5/1915 | Wightman et al. |
| 1,633,586 A * | 6/1927 | Hunter ............ A61F 13/122 2/171 |

(Continued)

FOREIGN PATENT DOCUMENTS

| CN | 103120383 A | 5/2013 |
| WO | WO 1986000197 A1 | 1/1986 |

OTHER PUBLICATIONS

U.S. Appl. No. 14/986,693, filed Jan. 3, 2016, now U.S. Pat. No. 10,314,354 issued Jun. 11, 2019.

*Primary Examiner* — Joshua E Rodden
(74) *Attorney, Agent, or Firm* — McCarter & English, LLP

(57) ABSTRACT

Disclosed is a wearable thermal protection and perspiration management apparatus that includes a two-ply composite main body and an inner layer of elastic material. The two-ply main body includes an outer layer made of moisture absorbent material and an interior layer made of moisture wicking material this is arranged in contact with the outer layer of moisture absorbent material. The interior layer provides a moisture barrier which is adapted for preventing captured moisture from contacting a wearer's body. The inner layer of elastic material is adapted and configured to secure the two-ply composite main body in contact with the wearer's body. Preferably, the two-ply composite main body has a Thermal Protective Performance rating of greater than 35 $cal/cm^2$.

12 Claims, 2 Drawing Sheets

Related U.S. Application Data

(60) Provisional application No. 62/100,187, filed on Jan. 6, 2015.

(51) Int. Cl.

| | | |
|---|---|---|
| *B32B 5/06* | (2006.01) | |
| *B32B 5/08* | (2006.01) | |
| *B32B 27/12* | (2006.01) | |
| *B32B 5/02* | (2006.01) | |
| *A61B 1/00* | (2006.01) | |
| *A41D 31/12* | (2019.01) | |
| *A41D 31/06* | (2019.01) | |
| *B32B 25/10* | (2006.01) | |
| *A41D 13/08* | (2006.01) | |
| *A41D 13/05* | (2006.01) | |

(52) U.S. Cl.
CPC ......... *A41D 13/088* (2013.01); *A41D 31/065* (2019.02); *B32B 5/024* (2013.01); *B32B 5/026* (2013.01); *B32B 25/10* (2013.01); *A41D 2500/10* (2013.01); *A41D 2500/20* (2013.01); *A41D 2600/20* (2013.01); *B32B 2307/306* (2013.01); *B32B 2437/00* (2013.01)

(58) Field of Classification Search
USPC .............................................................. 2/69
See application file for complete search history.

(56) References Cited

U.S. PATENT DOCUMENTS

| | | | |
|---|---|---|---|
| 2,783,474 A * | 3/1957 | Campagna | A41D 20/00 2/171 |
| 4,244,057 A | 1/1981 | Burnham | |
| 4,603,440 A | 8/1986 | Hale | |
| 4,742,581 A * | 5/1988 | Rosenthal | A41D 20/005 2/170 |
| 4,843,653 A | 7/1989 | Coble | |
| 5,014,360 A | 5/1991 | Smith | |
| 5,090,060 A | 2/1992 | Gates | |
| 5,305,470 A * | 4/1994 | McKay | A41D 20/005 2/170 |
| 5,555,564 A | 9/1996 | Welch | |
| 5,706,521 A | 1/1998 | Haney | |
| 5,826,277 A * | 10/1998 | McConville | A41D 20/00 2/171 |
| 5,915,532 A * | 6/1999 | Williams | A41D 20/00 2/171 |
| 6,971,122 B2 * | 12/2005 | Sanchez | A41D 20/00 2/174 |
| 7,383,588 B2 * | 6/2008 | Victor | A41D 20/00 2/16 |
| 7,752,681 B2 | 7/2010 | Michel | |
| 7,766,014 B2 | 8/2010 | Piret | |
| 8,209,776 B1 | 7/2012 | Aragon | |
| 8,898,812 B2 | 12/2014 | Thompson et al. | |
| 8,910,312 B1 | 12/2014 | Apisa | |
| 2002/0073475 A1 | 6/2002 | Bloom | |
| 2004/0031120 A1 | 2/2004 | Cherian | |
| 2007/0118943 A1 | 5/2007 | Stockhamer | |
| 2007/0234466 A1 | 10/2007 | Stengel | |
| 2009/0112143 A1 * | 4/2009 | Fournet, II | A61F 13/10 602/57 |
| 2010/0031411 A1 * | 2/2010 | Andrews | A41D 19/01558 2/20 |
| 2011/0016610 A1 * | 1/2011 | Wieder | A45F 5/00 2/170 |
| 2011/0247125 A1 | 10/2011 | Fournier | |
| 2013/0031703 A1 * | 2/2013 | Curtis | A41D 31/14 2/455 |
| 2014/0173806 A1 | 6/2014 | Fournier | |
| 2016/0262470 A1 * | 9/2016 | Blythe | A41D 20/00 |
| 2016/0361015 A1 | 12/2016 | Wang | |

\* cited by examiner

WEARABLE THERMAL PROTECTION AND PERSPIRATION MANAGEMENT APPARATUS AND METHOD

CROSS-REFERENCE TO RELATED APPLICATIONS

This application claims priority to and is a continuation-in-part of U.S. patent application Ser. No. 14/986,693 filed on Jan. 3, 2016 and entitled "Apparatus and Method for Perspiration Management", which claims priority to U.S. Provisional Patent Application Ser. No. 62/100,187 filed on Jan. 6, 2015 and entitled "Apparatus for Perspiration Wicking and Moisture Management", the disclosures of each of these applications are incorporated by reference in their entireties.

BACKGROUND OF THE DISCLOSURE

1. Field of the Disclosure

The present disclosure is directed to wearable thermal protection and perspiration management apparatuses and methods for making the same, and more particularly to, apparatuses, garments or articles of manufacture that are adapted to be worn on the body and provide both protection to the wearer from exposure to heat sources and perspiration removal and management during activities such as, for example, cooking, working in hot indoor and outdoor environments and athletics.

2. Background of the Related Art

It is human nature to naturally gravitate and seek specific regions of the body to eliminate or remove perspiration that is collected and produced in other regions of the body. Active people will often try to remove perspiration from their forehead with their own hand and then wipe it off on their apparel or try to wipe it off directly with a sleeve or other area of their shirt or a towel. These methods are not effective for removing or managing perspiration and merely transfer the moisture from one body part to another or result in saturating a material not designed to absorb large amounts of moisture.

Other current art, such as sweat bands, head bands, and towels, are typically constructed of Terrycloth cotton and form a single material on all internal and external surfaces. As such, they are poor at removing perspiration once they have reached their saturation point. Additionally, limitations of the absorption capabilities of Terrycloth prevent the transport of perspiration away from the sweat band.

Additionally, the use of a towel is inconvenient during the course of regular physical activity as it is not persistently available to the user and requires the user to utilize a free hand to manipulate the towel. Moreover, in applications such as cooking or in industrial settings which require both hands to be free to operate, the use of a towel or similar device is inconvenient and can increase the risk of injury. Finally, current art has not been designed to be placed on other areas of the body which are natural removal points of perspiration such as the forearm, upper arm, torso, thighs, calves, buttocks, and back of the hand.

For example, intense fitness activities such as cross training, spinning, group fitness and hot yoga cause participants to produce excessive perspiration. Current art does not utilize advanced absorptive materials now available to effectively remove and manage the excessive perspiration of today's athletes, nor do they offer the flexibility of the user to locate said inventions to desired areas of the body that will not interfere with the performance of the wearer's activity.

Typically, these athletic activities require the user to maintain control of their hands and concentration in order to perform the activity which is not adequately serviced by current art, such as towels. In addition to exercise and athletics, perspiration-inducing environments exist for many professionals in indoor and outdoor occupational fields such as culinary, firefighting, medical, construction and industrial jobs, which are also not well served by current art. In some, if not all, of these other activities, in addition to perspiration management, thermal protection and/or burn protection is desired and may be required. Additional indoor workplaces in which the worker could utilize a device which provides hands free perspiration management and thermal protection includes, iron and steel foundries, brick firing and ceramic plants, glass products facilities, electrical utilities (particularly boiler rooms), bakeries, commercial kitchens, laundries, chemical plants, material handling and distribution warehouses, and many other environments. Additional outdoor workplaces could include, for example, locations with hot weather and direct sun, such as farm work, construction, oil and gas well operations, landscaping, emergency response operations and hazardous waste site.

Therefore, there is a need for apparatuses, garments or articles of manufacture that are adapted to be worn on the body and provide both protection to the wearer from exposure to heat sources and perspiration removal and management during activities such as, for example, cooking, working in hot indoor and outdoor environments or athletics.

SUMMARY OF THE INVENTION

The present disclosure is directed to a wearable thermal protection (e.g., burn protection) and perspiration management apparatus. The apparatus includes a two-ply composite main body which has an outer layer and an interior layer. Those skilled in the art will readily appreciate that more than two plies can be used without departing from the scope of the present invention. The outer layer is made of moisture absorbent material. The interior layer is made of moisture wicking material and is in contact with the outer layer of moisture absorbent material.

The interior layer provides a moisture barrier which is adapted for preventing captured moisture from contacting a wearer's body. The wearable apparatus further includes an inner layer of elastic material adapted and configured to secure the two-ply composite main body in contact with the wearer's body. Preferably, the two-ply composite main body has a Thermal Protective Performance (TPP) rating of greater than 35 cal/cm$^2$. However, as noted above, the present disclosure is not limited to a device or apparatus that is made using a two-ply material. When the device includes additional layers, the TPP rating is likely to increase.

The present disclosure is also directed to novel apparatuses and methods to intuitively and ergonomically remove and manage perspiration on the human body while simultaneously providing thermal protection during any indoor and outdoor activity that requires the removal of perspiration while enhancing comfort and performance for the wearer. The presently disclosed apparatuses are particularly useful when the wearer is working in hot or dangerous environments that may include exposure to dangerous heat sources, such as ovens, burners, flames or hot equipment. The apparatuses are composed of unique materials that have not been previously applied for this purpose.

The apparatuses are designed to utilize perspiration-absorbing and wicking materials with superior absorption rates and greater moisture holding capacity than prior inventions. The unique combination of materials that are used to form the layers of the device result in a product that also provides thermal protection to the wearer.

These highly absorptive and thermally resistant materials are used in combination with perspiration wicking materials to transport unwanted perspiration away from the contact point of the apparatus and the wearer. Additionally, the invention incorporates materials with elastic properties to secure the apparatus onto specific regions of the body facilitating the method of use. This method by which the apparatus is employed allows the wearer to naturally remove and manage perspiration without the apparatus interfering with the wearer and their current activity.

This patent covers the method by which humans remove perspiration from their bodies through the utilization of specific perspiration management apparatus that is strategically placed on the body during activities of physical exertion that are likely to produce perspiration.

The apparatus of the present invention is adaptable to be worn on various locations of the wearer's body dependent on the individual and type of activity they are engaged in. The purpose is to make available, easily and naturally to the wearer, an apparatus that is used to remove and collect perspiration from various points of the body while simultaneously providing thermal protection.

The invention is constructed of absorbent, wicking, fast drying and flexible materials used in an optimal configuration of layers to achieve high performance perspiration management that integrates into the active individuals movements. It is produced by combining moisture absorbing materials, moisture wicking materials, and elastic materials to act as a band, wrap, or sleeve. This article is intended for use by individuals during exercise, work, play or any activity that may require enough exertion to cause the individual to perspire. Preferably, the article, apparatus, garment or device also provides thermal protection, including burn protection, to the user who may be engaged in activities that include heat exposure. The wrap, as illustrated in the figures can be placed on various strategic points on the body that are natural locations for the wearer to utilize the apparatus to remove perspiration and moisture.

Once the invention is in place on the wearer's body and the wearer begins to perspire from exertion, there is no need for instruction on use of the apparatus as the wearer can naturally and intuitively wipe away perspiration in fluid movements that do not interfere with the activity being performed. For example, a runner or cyclist perspiring from their forehead and face would reach up to their head with the absorbent material of the invention covering the back of their hand and wrist to remove the perspiration without distracting from the performance of their activity. Similarly, during the performance of bending or seated Yoga or stretching activities, the participant could remove moisture from their hands by applying the apparatus to their lower leg or calf area, allowing them to conveniently, comfortably and safely continue their activity with dry hands. This alleviates the need for saturating their athletic apparel or using a towel that would be placed on a dirty floor. The apparatus is designed to be washed and reused by the wearer. Moreover, during the performance of activities in hot environments, such as cooking, the user can remove moisture from their hands or forehead using an apparatus that is worn on the forearm and is constructed using materials that provide sufficient thermal protection to protect the user from suffering second degree burns, for example.

BRIEF DESCRIPTION OF THE SEVERAL VIEWS OF THE DRAWING

While the specification concludes with claims particularly pointing out and distinctly claiming the subject matter of the invention, it is believed the present disclosure will be better understood from the following description taken in conjunction with the accompanying drawings, wherein:

These and other aspects of the subject disclosure will become more readily apparent to those having ordinary skill in the art from the following detailed description of one or more embodiments of this disclosure taken in conjunction with the drawings.

DETAILED DESCRIPTION OF THE INVENTION

Embodiments of this disclosure are now described more fully with reference to the accompanying drawings, in which illustrated embodiments are shown. This disclosure is not limited in any way to the illustrated embodiments as the description below is merely provides exemplary embodiments in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the embodiments disclosed herein. Furthermore, the terms and phrases used herein are not intended to be limiting but rather to provide an understandable description of the embodiments herein.

Figures 1, 2:
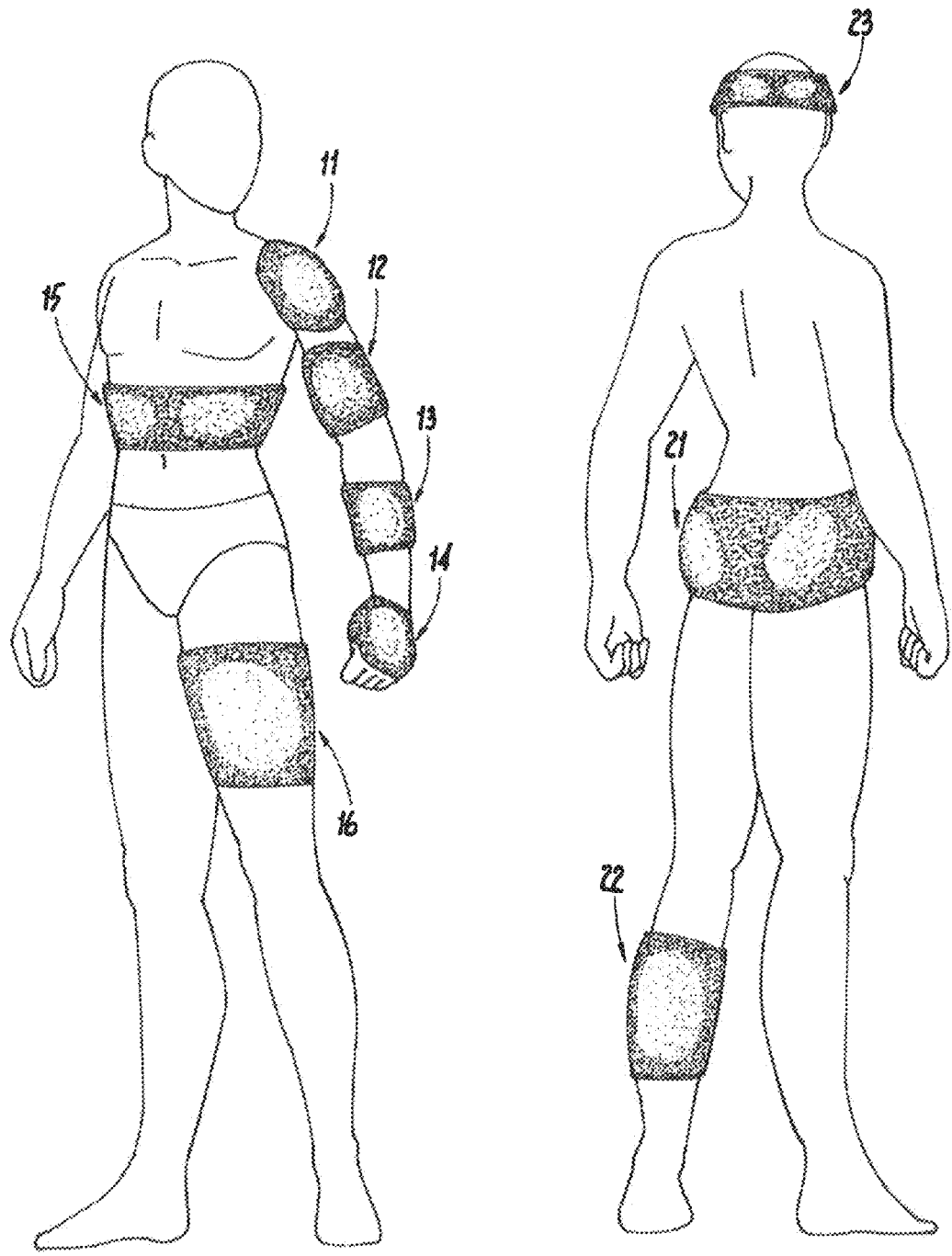
FIG. 1—displays various points on the body that the apparatus can be positioned when viewing the body from the front.
FIG. 2—displays various points on the body that the apparatus can be positioned when viewing the body from the rear.

Referring now more particularly to the accompanying drawings which show several of the preferred embodiments of the invention, FIG. 1 shows the shoulder having a perspiration band 11 positioned specifically with the moisture absorbing material facing forward, upward, and away from the body, specifically positioned to be used to remove moisture from the face, more specifically the cheek. This is accomplished by having the wearer raise the shoulder in a shrugging motion which positions the moisture absorbing material upward and against the side of the face/cheek.

FIG. 1 also shows the bicep/upper arm having a perspiration band 12 positioned specifically with the moisture absorbing materials facing forward and away from the body, specifically positioned to be used to remove moisture from the head, more specifically from the side of the head and ear. This is accomplished by having the wearer wipe the side of the head by raising the arm up and wiping the side of the head utilizing the bicep/upper arm apparatus.

FIG. 1 additionally demonstrates the forearm having a perspiration band 13 positioned specifically with the moisture wicking band positioned upwards and away from the wearer. This position is used to address moisture that gathers on the wearer's forehead and it is intended that the wearer will raise their arm and position the forearm on the forehead and brow of the face to remove moisture.

FIG. 1 further illustrates a perspiration band 14 positioned on the hand in a glove format in which the moisture absorption material is positioned on the top of the hand. This example of the apparatus can be utilized to remove moisture from various positions of the body include, but not limited to, the bottom/palm of the alternate hand, the forehead, the cheek, the side of the neck, and the back of the thigh and calf.

FIG. 11 further demonstrates a perspiration band 15 positioned across the lower torso (or belly) with the moisture absorbing material facing out and away from the body. From this position, the wearer can utilize the band to remove moisture from the various positions of the body including, but not limited to, the palms of the hand, the underside of the forearm, and the fingers.

Lastly, FIG. 1 shows a perspiration band 16 positioned on the thigh of the wearer. The moisture absorbing materials is positioned away from the body. From this point of placement, the wearer can utilize the apparatus to remove perspiration from the hand and forearm.

FIG. 2 shows the perspiration apparatus 21 positioned on the buttock of the wearer on both sides of the body. The moisture absorbing material is positioned away from the body. It is intended that the wearer will utilize the apparatus 21 to remove moisture from the hands.

FIG. 2 further demonstrates a perspiration device 22 being positioned on the calf of the wearer. The moisture absorbent material is positioned away from the body and facing rearward. The device 22 is intended to support the wearer in removing moisture from the hands as well as the alternate calf. Lastly, FIG. 2 additionally illustrates a perspiration device 23 being positioned on the head of the wearer.

Figure 3:
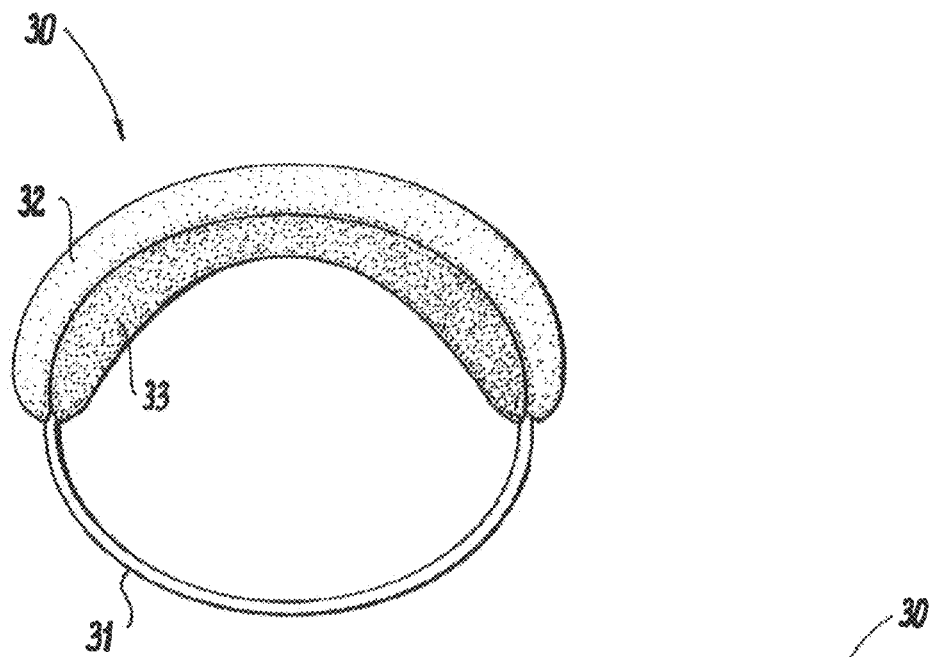
FIG. 3—cross section of the apparatus wrapped around a simulated section of the human body (e.g. forearm, thigh, calf)
Figure 4:
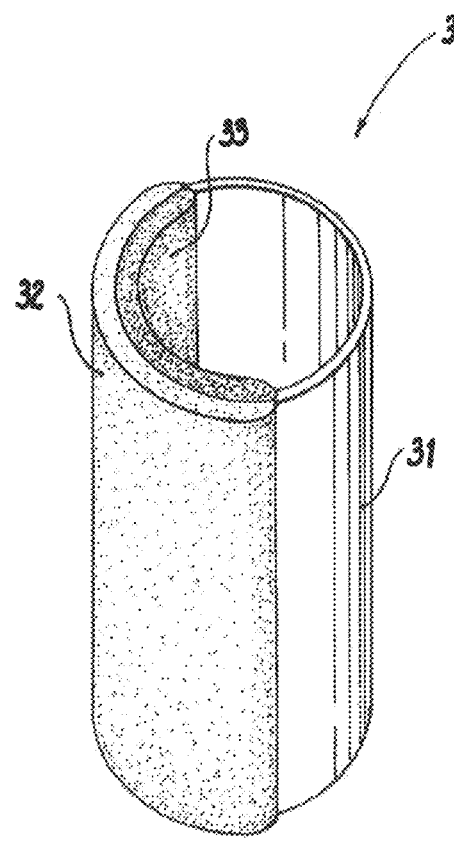
FIG. 4—perspective view of the apparatus wrapped around a simulated section of the human body (e.g. forearm, thigh, calf).

FIG. 3 shows a cross section of a perspiration device 30 as it may appear on various parts of the body including the forearm, bicep, and thigh. It is intended to demonstrate the design of the apparatus as it is intended to use on any part of the body.

Item 31 represents the elastic layer which is comprised of a 4-way stretch material such as Lycra, Spandex, Luan, or similar This material allows the apparatus to adjust to fit multiple parts of the body and various sized users and to conform the apparatus to the shape of the wearer. This elastic property will be the primary mechanism that allows the device to remain positioned on the body of the wearer by means of the compressive properties of the elastic.

Item 32 represents the moisture absorbency layer of the apparatus that is utilized as the mechanism to manage perspiration. This layer contains multiple materials that are woven together as a single element comprised of Cotton, Bamboo, Polyester and other fibrous materials designed to absorb and transfer perspiration away from the surface. The surface being defined as the area that is in direct contact with the air and the point of contact with which the wearer would use the apparatus to remove sweat from other parts of the body (e.g. the forehead). This layer is also designed to distribute perspiration from the surface down the layer in order to maximize absorbency while allowing the surface to absorb more perspiration.

Item 33 serves as an additional wicking layer that transports the perspiration captured in layer 32 and distributes it laterally to increase absorption capacity. This layer additionally provides a barrier between captured perspiration and the wearer's skin inside the apparatus.

In order to utilize the apparatuses, garments or articles of the present disclosure in applications wherein a user such as a chef, firemen or racecar driver may potentially be exposed to a heat source or flame, they must be certified in accordance with the National Fire Protection Association standards.

Whether its culinary service garments or firefighter turnout gear, boots or gloves, rigorous tests are performed to ensure the product can withstand the thermal conditions associated with the job. National Fire Protection Association 1971 certification requires the greatest number of tests, across the widest range of protections (heat, flame, liquids, viral penetration, and durability tests).

Amongst the most well-known and discussed test results are Thermal Protective Performance (TPP) and Total Heat Loss (THL). The presently disclosed apparatuses, devices, garments have been tested to determine a TPP rating (Thermal Protection Performance). TPP is a calculated value that manufacturers use to rate the exposure to heat, energy and the approximate time before skin is subject to second degree burns (when skin starts to blister). Typically, the only way to increase the TPP value is by adding layers.

A two-ply fabric cut from forearm sweat sleeve that was constructed in accordance with the present disclosure was tested to determine its TPP rating. One layer was a quilted fabric and the other a knit fabric. The test was conducted with the quilted layer closest to the heat source. The results of the test were as follows:

| Burn # | Time to Burn (sec) | TPP Value (cal/cm$^2$) |
| --- | --- | --- |
| 1 | 17.681 | 35.501 |
| 2 | 19.566 | 38.891 |
| 3 | 20.406 | 40.560 |
| 4 | 17.756 | 35.292 |
| 5 | 20.064 | 39.880 |
| Average | 19.094 | 38.027 |

| Calibration Parameters | |
| --- | --- |
| Calibrated HF (kW/m$^2$) | 83.218 |
| Calibrated HF (cal/sec · cm$^2$) | 1.988 |

A total of six samples were submitted for testing. The sixth sample was separated and the two component layers were tested individually. This was done to provide an idea of how each individual layer would perform under similar conditions as the combined fabrics were tested.

| Burn # | Time to Burn (sec) | TPP Value (cal/cm$^2$) |
| --- | --- | --- |
| Quilt Layer only | 10.346 | 20.563 |
| Knit Layer Only | 4.965 | 9.868 |

As shown above, the sample article exhibited a TPP rating of 38 cal/cm$^2$ on average and the results ranged between 35 and 40 cal/cm$^2$. Such a TPP rating will protect the wearer from suffering second degree burn for 17 seconds and is considered acceptable for articles or garments such as firefighter turnout gear. As a result of the materials performance, the articles, apparatuses and garments of the present disclosure provide sufficient thermal protection such that they can be utilized in applications that have the potential for exposure to heat, such as culinary applications.

The information provided and invention as presented have been described to the inventor's preferred incarnations, it will be understood by those skilled in the art that various changes may be made and elements or materials substituted or modified without departing from the true intent and scope of the invention.

What is claimed is:

1. A wearable thermal protection and perspiration management apparatus, the apparatus comprising:
   a two-ply composite main body which includes:
   i) an outer layer made of moisture absorbent material and having an upper surface in contact with air when the apparatus is in use;
   ii) an interior layer made of moisture wicking material in contact with the outer layer of moisture absorbent material, the interior layer having a lower surface which is in direct contact with a wearer's body when the apparatus is in use, the interior layer providing a moisture barrier which is adapted for preventing captured moisture from contacting the wearer's body; and
   an inner layer of elastic material adapted and configured to secure the lower surface of the interior layer of the two-ply composite main body in contact with the wearer's body.

2. The apparatus as recited in claim 1, wherein the two-ply composite main body has a Thermal Protective Performance rating of greater than 35 cal/cm2.

3. The apparatus as recited in claim 1, wherein the outer layer of moisture absorbent material is comprised of three layers, a first layer being made of moisture absorbing material containing approximately 70% bamboo and about 30% organic cotton, and a second layer of a different moisture absorbent material and a backing layer of wicking polyester which is arranged adjacent to the interior layer of moisture wicking material.

4. The apparatus as recited in claim 1, wherein an additional inner layer made of a moisture wicking material made from at least one of a nylon, polyester or a cotton blend is applied as an additional layer of moisture transport and as a protective barrier for the comfort of the wearer.

5. The apparatus as recited in claim 1, wherein the apparatus is adapted to be worn over a lower part of a wearer's hand and covering a wrist and lower forearm.

6. The apparatus as recited in claim 5, further including a thumbhole to provide additional coverage area and greater stability of keeping the apparatus in a desired location.

7. The apparatus as recited in claim 1, wherein the apparatus is adapted to be worn over a wearer's wrist and lower forearm.

8. The apparatus as recited in claim 1, wherein the inner layer of elastic material is configured to allow the apparatus to be worn on a wearer's shoulder, bicep/upper arm, lower torso, thigh/upper leg, calf, buttocks or head.

9. A wearable thermal protection and perspiration management garment, the garment comprising:
   a composite main body having a Thermal Protective Performance rating of greater than 35 cal/cm2, the compositing main body including:
   i) a quilted outer layer made of moisture absorbent material and having an upper surface in contact with air when the apparatus is in use; and
   ii) a knitted interior layer made of moisture wicking material in contact with the outer layer of moisture absorbent material, the interior layer having a lower surface which is in direct contact with a wearer's body when the apparatus is in use, the interior layer providing a moisture barrier which is adapted for preventing captured moisture from contacting the wearer's body; and
   a layer of elastic material adapted and configured to secure the lower surface of the interior layer of the two-ply composite main body in contact with the wearer's body.

10. The garment as recited in claim 9, wherein the layer of elastic material is configured to allow the garment to be worn on a wearer's hand, wrist, bicep/upper arm, forearm or head.

11. The garment as recited in claim 9, wherein the outer layer of moisture absorbent material is comprised of three layers, a first layer being made of moisture absorbing material containing approximately 70% bamboo and about 30% organic cotton, and a second layer of a different moisture absorbent material and a backing layer of wicking polyester which is arranged adjacent to the interior layer of moisture wicking material.

12. The garment as recited in claim 9, wherein an additional inner layer made of a moisture wicking material made from at least one of a nylon, polyester or a cotton blend is applied as an additional layer of moisture transport and as a protective barrier for the comfort of the wearer.

* * * * *